Nov. 12, 1963  N. E. CHASEK  3,110,862
COHERENT CARRIER REGENERATOR
Filed Aug. 10, 1961  5 Sheets-Sheet 1

INVENTOR
N. E. CHASEK
BY
ATTORNEY

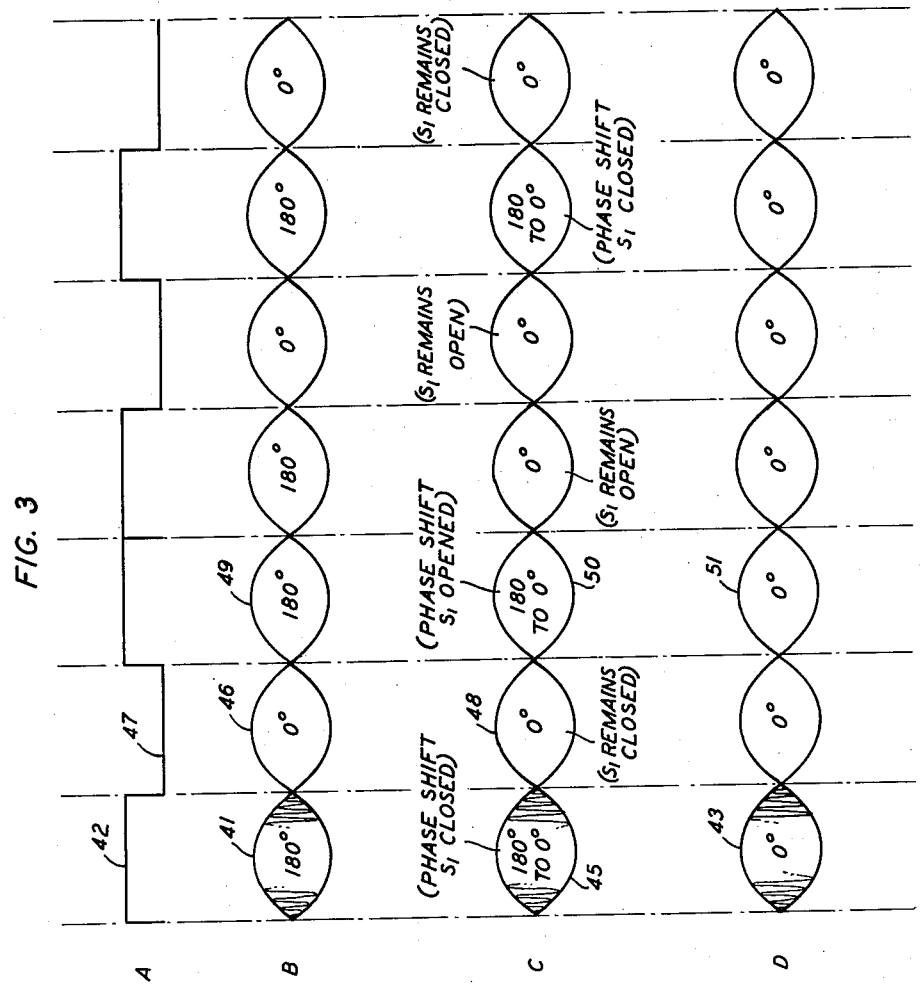

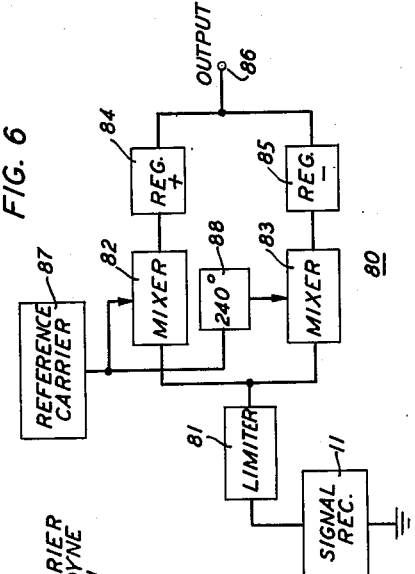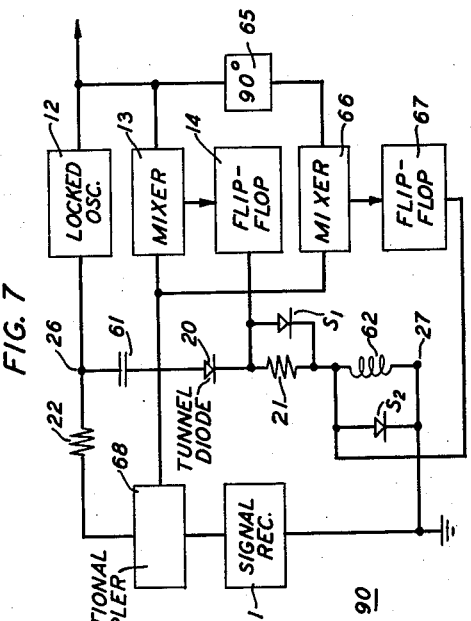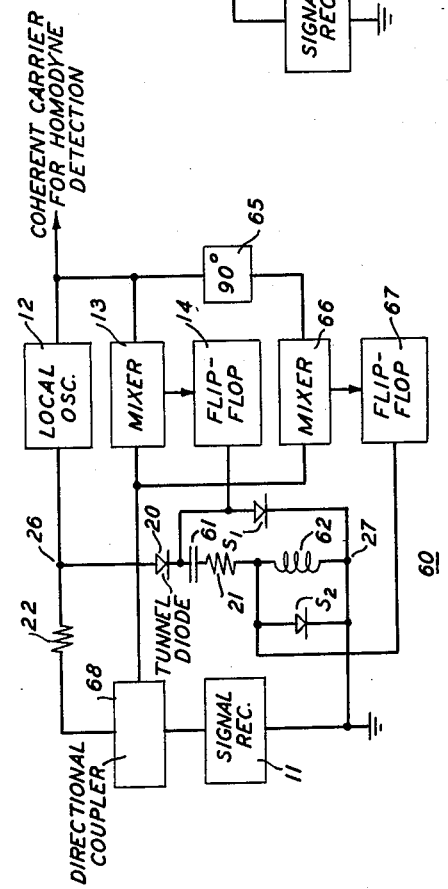

| REC'D. SIGNAL PHASE | REQ'D. NETWORK PHASE SHIFT | MIXER 13 | | | | MIXER 66 | | | | SWITCH POSITIONS | |
|---|---|---|---|---|---|---|---|---|---|---|---|
| | | SIGNAL PHASE | L.O. PHASE | PHASE DIFF. | OUPUT PULSE | SIGNAL PHASE | L.O. PHASE +90° | PHASE DIFF. | OUTPUT PULSE | $S_1$ OPEN (0.5) CLOSED (-1) | $S_2$ OPEN (-.866) CLOSED (+.866) |
| 180° | 180° | 180° | 0° | 180° | -1 | 180° | 90° | -90° | 0 | CLOSED | — |
| 300° | 60° | 300° | 0° | +60° | +0.5 | 300° | 90° | -30° | -.866 | OPEN | OPEN |
| 60° | 300° | 60° | 0° | +60° | +0.5 | 60° | 90° | -30° | +.866 | OPEN | CLOSED |

INVENTOR
N. E. CHASEK
BY
*G. E. Hinchs Jr.*
ATTORNEY

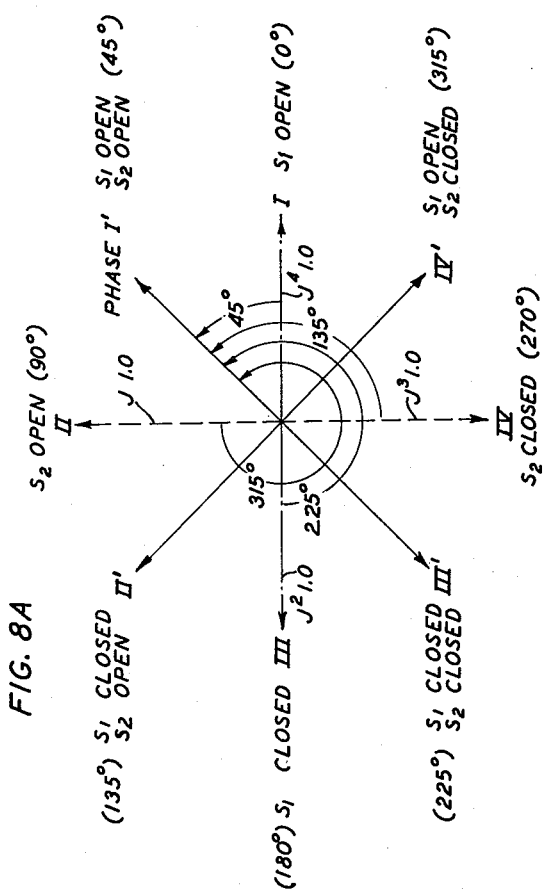

United States Patent Office 3,110,862
Patented Nov. 12, 1963

3,110,862
COHERENT CARRIER REGENERATOR
Norman E. Chasek, Stamford, Conn., assignor to Bell
Telephone Laboratories, Incorporated, New York,
N.Y., a corporation of New York
Filed Aug. 10, 1961, Ser. No. 130,610
21 Claims. (Cl. 325—30)

This invention relates to communications systems and, more particularly, to coherent carrier regenerator and demodulator apparatus.

A primary object of the invention is to simplify the apparatus required for regenerating a coherent carrier of precise phase and frequency for the demodulation of noncoherent or suppressed carrier double sideband (DSB) signal information. A related object of the invention is to demodulate three phase position coded information with apparatus of uniquely simple construction suitable for use in high speed, large capacity data transmission systems.

Perhaps the most important virtue of suppressed carrier transmission is that it permits the inherent capabilities of the modulation process per se to be exploited most nearly to its optimum practical extent. One basic and very important advantage of such transmission is that a saving in transmitter power of over 12 db may be realized over that required in a conventional AM system with continuous carrier present. Similarly, binary phase position modulation, which produces an effectively suppressed carrier, has a 6 db peak transmitted power advantage over on-off modulators with carrier for the same received error rate and with no required increase in channel bandwidth. Such savings in transmitter power likewise apply for the higher order codes of phase position modulation.

One factor detracting from the advantages of DSB carrierless transmission in either continuous or phase position coded form has been the difficulty encountered in generating an accurate and properly phased carrier for the demodulation of such information. In particular, such a local carrier is required for use in a conventional homodyne detector or product demodulator.

Prior art systems have generally obtained the necessary coherent carrier at the receiving terminals by utilizing (1) an extremely accurate crystal-controlled local oscillator, approaching the requirements of a frequency standard source, (2) dual mixers for beating both the upper and lower sideband frequencies against a local oscillator, or (3) suitable mixing and frequency translating circuits responsive to carrier pilot signals transmitted together with the signal information in the sidebands.

In prior binary phase position systems, i.e., a system wherein a zero phase condition of a carrier wave represents a pulse and a predetermined phase shift, usually 180 degrees, represents a space, frequency doubler circuits have generally been used in conjunction with a local oscillator and one or more phase detectors to generate a local coherent carrier. Circuits of the aforementioned types thus normally require extremely accurate local oscillator circuits and/or carrier regenerator apparatus which is quite complex.

In addition to the need for simplified, high speed apparatus for supplying an accurate local reference carrier, a need has also arisen for more versatile and sophisticated data transmission circuits capable of operating with higher order codes, viz., ternary or quaternary codes as distinguished from the usual binary codes. Such codes appear particularly promising with respect to the amount of information that may be transmitted within a given bandwidth and with respect to the ratio of signal to noise (S/N) that may be realized therewith. As contrasted with binary phase position modulation, which has been utilized for many year in the telegraph art, three phase position modulation, for example, affords approximately a 1 db net advantage over its binary counterpart while at the same time reducing the radio-frequency bandwidth by a factor of approximately 60 percent. Four phase position modulation further decreases the necessary bandwidth for a given amount of transmitted data with only a slight reduction in threshold as compared to the three phase position code. In comparison to conventional binary AM or frequency shift keying (FSK) systems, even binary phase position modulation has at least a 3 db net advantage in threshold in addition to the approximately 6 db advantage in peak transmitter power required. For these reasons, phase position modulation systems have recently been given serious consideration, particularly in low power applications, such as in space satellite communications.

Unfortunately, prior art binary phase position demodulators cannot ordinarily be used either to regenerate an accurate local reference carrier or to decode three phase position coded information. The difficulty encountered in decoding three phase position signals is that the demodulator must be responsive to (and constructed to correlate properly) three distinct code symbols in contrast to just the pulse and space in a binary system.

In accordance with an aspect of the present invention, the disadvantages and limitations of prior art carrier regenerators are substantially alleviated by utilizing a unique combination of a phase shift network and a phase shift detection circuit to reconstruct a strong, coherent carrier at the receiving end of a system. The phase shift network may be substantially of the form utilized in the phase position modulators disclosed in my copending application Serial No. 130,626, filed of even date herewith. For binary operation, the phase shift network comprises a negative resistance (tunnel diode), a positive resistance (resistor), and means for selectively altering the magniture of the positive resistance. Preferably, the resistance elements are connected in series across the input terminals of the regenerator.

In its simplest illustrative form, e.g., for binary or analog applications, the phase shift detection circuit of the regenerator comprises an oscillator initially locked in phase with the original carrier wave, a mixer, a flip-flop circuit and a high-speed switching diode.

The regenerator functions in the following manner: Whenever the phase of the received signal is shifted in accordance with a predetermined code so that it is out-of-phase with the output of the locked oscillator, a negative pulse from the mixer actuates the flip-flop circuit and in turn actuates the switching diode connected across the resistor. As a result, the resistor connected in series with the tunnel diode is either short-circuited (reduced to zero magnitude), or not (remains full value), depending on the previous state of the switch. In either case, the phase of the received signal is inverted or shifted back to the reference phase of the locked oscillator. That such phase shifts occur is best seen by examining what happens when the positive resistnace is selectively short-circuited. With the values of positive and negative resistance in series properly chosen, the net effective value of series resistance may be made to remain constant with only the sign of the resistance changed as the positive resistance is short-circuited. As will be shown in greater detail hereinafter, the resulting periodic changes in the sign of resistance at the modulation rate produces a time-varying resistance function $R(t)$. This function $R(t)$ effectively produces frequency components peculiarly related to both the original carrier and the sideband signal frequencies, and may be expressed as a Fourier series of a square wave.

In accordance with the invention, the product of the locally generated frequency components and the upper and lower signal sideband frequency components produces a local carrier in which the oscillator is locked in precise phase and frequency with the original coherent carrier. The output of the oscillator thus constitutes a strong coherent local carrier which may be utilized in the demodulation of signal information, as for example, in a conventional homodyne detector. With such a unique arrangement, expensive local oscillators, frequency doubler and divider circuits or frequency detecting and translating circuitry required for the reception of pilot frequencies are eliminated.

In accordance with another aspect of my invention, the novel carrier regenerator apparatus applicable for use in the demodulation of three and four phase position signals also includes a unique control loop to prevent "wobble" in the phase of the regenerated carrier caused by varying phase quadrature components. In still another aspect of the invention, a vector sensor and pulse regenerator detector circuit is utilized in conjunction with the three phase position carrier regenerator to ascertain in which of the phase sectors the signal vector is located with respect to the reference sector. This unique combination comprises a complete phase position-to-pulse code demodulator.

The invention will be more fully apprehended from the following detailed description of preferred illustrative embodiments thereof considered in connection with the appended drawings, in which:

FIG. 3 shows several waveform of assistance in the exposition of the invention;

FIG. 4 is a schematic diagram of a carrier regenerator embodying the principles of the invention for use in the demodulation of three phase position coded information;

FIG. 6 is a block schematic diagram of a three phase position detector for use in conjunction with the carrier regenerator of FIG. 4;

FIG. 7 is a schematic diagram of a carrier regenerator embodying the principles of the invention for use in the demodulation of four phase position coded information; and FIGS. 8A and 8B are a vector diagram and a chart, respectively, of assistance in the exposition of the invention as related to the regenerator of FIG. 7.

Figure 1:
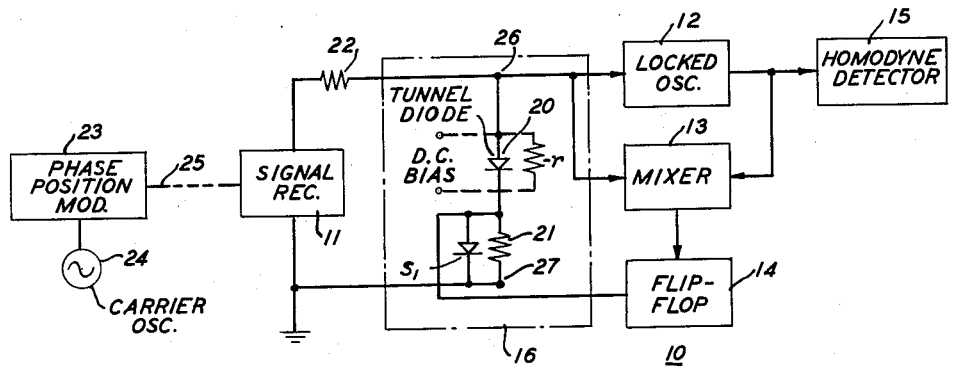
FIG. 1 is a schematic circuit diagram of a carrier regenerator, embodying the principles of the invention, applicable for use in the demodulation of suppressed carrier double sideband analog or binary phase position signals.

Referring now more particularly to the drawings, FIG. 1 depicts a carrier regenerator 10 suitable for use with a conventional homodyne detector in demodulating DSB suppressed carrier analog or binary phase position coded information. The regenerator 10 comprises a signal receiver 11, preferably of the constant current type, connected to a locked oscillator 12. The output of the oscillator 12 is applied both to a mixer 13, the output of which in turn is utilized to drive a flip-flop circuit 14, and to a homodyne detector 15 for demodulating the signal information. The output of the flip-flop 14 is connected to a phase shift network 16 depicted within a dash-lined box. The phase shift network 16 may include circuit elements similar to those that are utilized in the binary phase position modulator disclosed in my aforementioned copending application. Specifically, a negative resistance element 20, preferably comprising a tunnel diode, is connected in series with a resistor 21 having an appropriate positive resistance value across terminals 26, 27. As such, the series combination of positive and negative resistances is in shunt with the output terminals of the signal receiver 11. Resistor 22 represents the internal resistance of the receiver 11 plus any lead resistance shunting tunnel diode 20 and resistor 21.

A high speed switch $S_1$, shown for purposes of illustration as a switching diode, is connected across resistor 21 and biased in response to control pulses from the flip-flop circuit 14 so as to have alternately open and closed conductance states. The circuit for both producing the two desired values of bias voltage at the output of the flip-flop circuit and isolating it from the remainder of the regenerator may be of any well known form. Other forms of electronic switches responsive to electrical control pulses or impulses known to those skilled in the art also may be utilized with equal effectiveness. For the purpose of illustrating a complete system, a phase position modulator 23, which may include a final radio-frequency amplifier stage, and a carrier oscillator source 24 are shown at a remote transmitter location. The transmitting and receiving apparatus may be electrically connected through any suitable transmission medium indicated by the dashed line 25.

Considering the phase shift network 16 of regenerator 10 in greater detail, the value of negative resistance of the tunnel diode is chosen with respect to the total positive resistance of the network such that only the sign of the resistance combination across terminals 26, 27 changes whenever resistor 21 is short-circuited from or reinserted in the circuit. The phase of the applied carrier wave thereby shifts 180 degrees as a function of the series combination of resistances, i.e., the carrier phase shifts 180 degrees every time the sign of the resistance across terminals 26, 27 changes. It is this periodic change in the sign of resistance at the modulation rate that produces the resistance-derived frequency components which makes possible the generation of a strong, coherent local carrier. The value of positive resistance required to accomplish a change in sign of resistance through a 180 degree phase shift in regenerator 10 is given by the following equation:

$$r_{21} = \frac{2r_{20}(r_{22} - r_{20})}{r_{22} - 2r_{20}}$$

where the subscripts correspond to the reference numerals of the previously defined circuit resistance elements.

That the phase of the carrier shifts 180 degrees whenever resistor 21, selected to satisfy the above-cited equation, is either short-circuited from or electrically reinserted in the circuit of regenerator 10 is perhaps best seen from the following. Across the terminal points 26, 27 of the phase shift networks 16 the regenerated carrier may be defined, with switch $S_1$ open, as $I_0 r_{15} \sin \omega_c t$. When switch $S_1$ short-circuits resistor 21, the net resistance across terminal points 26, 27 remains constant, in accordance with the invention, but the sign of the resistance changes. Accordingly, with resistor 21 short-circuited, the equation for the regenerated carrier operated on by a negative coefficient may be rewritten in the form $$I_0|-r_{15}| \sin \omega_c t = I_0 r_{15} \sin \omega_c t + \pi$$

The value of negative resistance will of course depend on both the bias voltage applied to the tunnel diode as well as on the current flowing through it. It is for this reason that the signal receiver 11 preferably should be of the constant current type so as to insure that the negative resistance of the tunnel diode remains substantially constant during operation. For simplicity, circuitry for biasing the tunnel diode 20 and for isolating the radio-frequency portions from the direct-current portions of the carrier regenerator have not been shown. A technique for both biasing the tunnel diode and for restricting any possible self-oscillation of the diode to the suppressed carrier frequency $f_c$ is disclosed in my aforementioned copending application.

Figure 2:
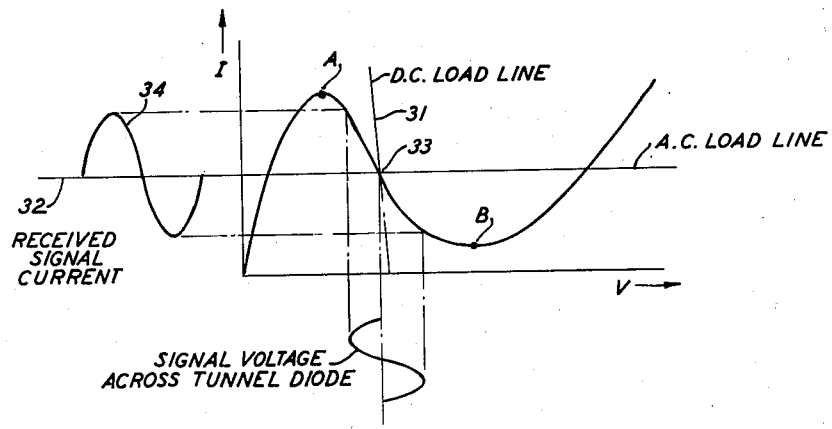
FIG. 2 is a diagram showing the current-voltage characteristic of a tunnel diode and, in particular, the negative resistance region thereof utilized in accordance with the invention.

In order to understand better the virtues of a tunnel diode as utilized in the invention, reference is made to FIG. 2 which depicts a typical current versus voltage curve 30 for such a device. In addition, FIG. 2 illustrates an exemplary direct-current load line 31 and an alternating-current load line 32 intersecting at a point 33 on the intermediate negative resistance region of the I–V curve. As may be seen, the negative resistance region is quite pronounced; it exists between the peak of the curve, designated point A, and the valley, designated point B. Waveform 34, shown relative to the alternating-current load line 32, depicts the applied signal current from receiver 11, and waveform 35, shown relative to a line drawn as a projection from the operating point 33 depicts the voltage produced by the signal current across the tunnel diode 20.

For the purposes of this invention, it is believed sufficient to state that because of its unique make-up, the tunnel diode offers many advantages over conventional negative resistance devices, such as the dynatron and point contact transistor in the common-emitter configuration. These include, in particular, extremely small negative time constants and very pronounced and substantially linear negative resistance regions. The latter characteristics in particular are made use in this invention. For a detailed description of the solid state physics of the tunnelling process which gives rise to the negative resistance characteristic of these diodes, reference may be made to an article entitled "New Phenomenon in Narrow Germanium P-N Junctions," L. Esaki, Physical Review, volume 109, pages 603–604, 1958.

Considering now more particularly the operation of regenerator 10 of FIG. 1, oscillator 12 is initially keyed in phase with the original carrier, for example, by a suitable identifiable code symbol transmitted either with or auxiliary to the signal information. Thereafter, whenever the phase of the received signal shifts, as from zero to 180 degrees, locked oscillator 12 responds slowly to this change, i.e., it tends to remain in its initially keyed phase condition. By then applying both the oscillator output and the received signal to mixer 13, an output signal is produced which is indicative of the phase difference, if any, between the two. The mixer output, for example, actuates flip-flop circuit 14 which in turn produces a bias signal for switching diode $S_1$. If, for example, the phase difference is substantially 180 degrees, the switching diode $S_1$ is biased to conduction; the resistor 21 in series with the tunnel diode 20 is short-circuited, and the phase of the received signal voltage is shifted from 180 degrees back to zero.

It is noted that in a DSB carrierless analog signal, the carrier phase alternates between zero and 180 degrees at the modulation rate. The same degree of phase shift is generally utilized in a binary phase position system since this provides the optimum threshold condition; i.e., one wherein the cross-correlation coefficient is a minus one. Accordingly, carrier regenerator 10 is particularly applicable for use in the demodulation of both types of signal information.

To envisage pictorially how the carrier regenerator 10 alters the phase of a received binary phase position coded signal, reference is made to FIG. 3. FIG. 3A depicts a pulse code train of signal information in a form, for example, that may be utilized to control a binary phase position modulator of the type described in my aforementioned copending application. FIG. 3B depicts an illustrative phase position modulated, raised cosine waveform of the type wherein each sucessive pulse of the code train of FIG. 3A that is preceded by a space effects a 180 degree phase shift of the carrier wave. FIG. 3C depicts the manner by which the received binary signal of FIG. 3B is modified by the phase shift network 16 of the regenerator 10 so as to coincide in phase with the output of the locked oscillator 12. The output of oscillator 12 is depicted in FIG. 3D.

Assume that the diode switch $S_1$ is biased by the output of flip-flop circuit 14 so that it is in the open or non-conducting state initially. Then the first phase position code character 41 of FIG. 3B (corresponding to the original pulse 42 of FIG. 3A) will be approximately 180 degrees out-of-phase with the arbitrarily chosen zero degree reference phase condition of the locked oscillator 12 (indicated by the waveform segment 43 of FIG. 3D). As previously described, this phase difference produces a control pulse at the output of mixer 13 which in turn actuates flip-flop 14 such that it will reverse the switching state of diode $S_1$. Having arbitrarily assumed that the diode switch was initially in the open state, the first control pulse from mixer 13 therefore actuates the flip-flop 14 such that the switching diode $S_1$ changes to its alternate conducting or closed state, thereby short-circuiting resistor 21 and shifting the phase of the code character 41 by 180 degrees. The modified carrier wave then appears at terminals 26, 27 of the regenerator in the condition indicated by the code symbol 45 of FIG. 3C. Conversely, the second or zero phase position code character 46 of the received signal depicted in FIG. 3B (corresponding to the absence of a pulse or, the space 47 in FIG. 3A), produces a zero valued control signal, i.e., no pulse, at the output of mixer 13 since the received signal is in phase with the output of the locked oscillator 12. Hence, the diode switch $S_1$ remains in its closed state short-circuiting resistor 21. The second code symbol 48 in FIG. 3C evidences the absence of a pulse by the absence of a phase shift. The next succeeding phase position code character 49 of FIG. 3B, however, being 180 degrees out-of-phase with the locked oscillator, effects a control pulse at the output of mixer 13 for actuating the flip-flop circuit 14 which in turn biases the switching diode such that it again opens and electrically reinserts resistor 21 in the circuit. This has the effect of again shifting the phase of the received signal code character 49 by 180 degrees, as indicated by code character 50 in FIG. 3C, so as to coincide with the phase of the locked oscillator as indicated by the waveform segment 51 in FIG. 3D.

As seen from FIGS. 3B and 3C, whenever two or more periods exhibiting the same phase occur in succession, the flip-flop 14 responds only to the first period of phase change and retains switch $S_1$ in the appropriate position until a subsequent phase change occurs. As such, switch $S_1$ is only actuated when there is an actual phase shift of the received signal detected. This switching characteristic is also generally preferred in the carrier regenerators to be described hereinafter.

In accordance with the invention, a strong, coherent carrier of the proper phase which keeps the locked oscillator in precise phase with the original carrier is produced by applying the product of the frequency components established by the time-varying resistance function $R(t)$ across the regenerator terminals 26, 27 and the sideband frequency components of the received signal to the input of the locked oscillator 12. The manner by which this is accomplished may most easily be seen from the following theoretical analysis.

The received signal $I$, in either analog or binary phase position form, may be defined as $$I(t) = I \cos \omega_i t \cos \omega_c t \qquad (1)$$

where $\omega_i$ is the modulation frequency and $\omega_c$ is the carrier frequency utilized for transmission.

By a straightforward trigonometric expansion, Equation 1 becomes:

$$I(t) = \frac{I}{2} \cos (\omega_c + \omega_i)t + \frac{I}{2} \cos (\omega_c - \omega_i)t \qquad (2)$$

Hence, the signal voltage applied to the input of the locked oscillator 12 and which also appears between the terminal points 26, 27, may be expressed as follows:

$$V_G = \left[ \frac{I}{2} \cos (\omega_c + \omega_i)t + \frac{I}{2} \cos (\omega_c - \omega_i)t \right] R(t) \qquad (3)$$

In Equation 3, R(*t*) represents the time-varying change in sign of the constant net value of resistance between terminals 26, 27. As such, R(*t*) may be considered as a resistance function produced by the alternating presence and absence, electrically, of resistor 21 in series with the negative resistance exhibited by the tunnel diode 20. The resistance function R(*t*) exhibits frequency components which may be expressed as a Fourier series of a square wave occurring at a rate of $\omega_1$. Such a wave takes the following form:

$$R(t) = R_1 \cos \omega_1 t + R_2 \cos 3\omega_1 t + \ldots \quad (4)$$

where $R_1$ and $R_2$ are the Fourier resistance coefficients of expansion. These coefficients are directly related to the negative and positive circuit resistances $r_{20}$ and $r_{21}$, respectively, the exact relationship being dependent on the particular odd harmonic utilized.

By substituting Equation 4 in Equation 3, the following equation is derived for the signal voltage developed across the resistor terminals 26, 27 and which is applied to the input of the locked oscillator:

$$V_g = \frac{IR_1}{4} \cos \omega_c t + \frac{IR_1}{4} \cos (\omega_c + 2\omega_i)t$$

$$+ \frac{IR_2}{4} \cos (\omega_c - 2\omega_i)t + \frac{IR_2}{4} \cos (\omega_c + 4\omega_i)t$$

$$+ \frac{IR_1}{4} \cos \omega_c t + \frac{IR_1}{4} \cos (\omega_c - 2\omega_i)t$$

$$+ \frac{IR_2}{4} \cos (\omega_c - 4\omega_i)t + \frac{IR_2}{4} \cos (\omega_c + 2\omega_i)t \quad (5)$$

It is seen from Equation 5 that there are two terms exhibiting frequency components at $\omega_c$, namely, the two terms $$\frac{IR_1}{4} \cos \omega_c t$$

The frequency components $\omega_c$, so generated, precisely lock the oscillator 12, which is initially tuned in the vicinity of $\omega_c$, at the frequency of the suppressed carrier. The resulting strong, coherent carrier produced at the output of the locked oscillator is then applied to a conventional homodyne detector or product demodulator, not shown, for demodulation of the signal content. By way of example, the output of the locked oscillator, $\cos \omega_c t$, together with the received signal defined in Equation 1, in terms of voltage, is normally applied to a mixer in the demodulator circuit so as to produce the following product:

$$[V \cos \omega_i t \cos \omega_c t][\cos \omega_c t] = \frac{V}{2} \cos \omega_i t + \frac{V}{2} \cos 2\omega_c t \quad (6)$$

The product of Equation 6 is then passed through a low-pass filter leaving only the term $$\frac{V}{2} \cos \omega_i t$$

remaining, which is the original signal information.

It is thus seen that the simplified apparatus comprising regenerator 10 affords a unique means for generating a strong, coherent carrier for the demodulation of any suppressed carrier signal information characterized by periodic phase shifts between two predetermined time-phase positions. Moreover, this technique is basically applicable to all higher order phase position codes as well, such as three, and four phase position codes utilizing, for example, multiple phase shifts of 120 and 90 degrees, respectively.

FIG. 4 depicts in diagrammatic form a coherent carrier regenerator 60 applicable for use in three phase position communications systems. In addition to the circuit elements corresponding to those of regenerator 10 (similarly identified), regenerator 60 further includes a capacitor 61 and an inductor 62 serially connected with the tunnel diode 20 and the resistor 21 across the terminals 26, 27. A second switch $S_2$, preferably comprising a switching diode, as shown, is utilized to selectively short-circuit the inductor 62.

For the demodulation of three or four phase position signals, it is only required that a local carrier in phase with one of the phase positions be generated. This may be accomplished by commencing signal transmission in the reference phase or, in a well known manner, by sending a periodic identifiable code symbol in such phase. If a coherent carrier is regenerated in a three or four phase position system by the same means described above for regenerator 10, "wobble" in the phase of the regenerated carrier, caused by varying phase quadrature components, may be experienced. For example, in the three phase position case, the phase could wobble plus or minus 60 degrees about the reference phase.

Therefore, in accordance with the invention, a second control loop is provided which comprises a 90 degree phase shifter 65, a mixer 66 and a flip-flop circuit 67. Mixer 66, as mixer 13, receives part of the received signal information before its phase is altered by a direct connection from a suitable network divider 68, which may comprise, for example, a dual output amplifier or a directional coupler as shown. This second control loop as constructed not only actuates switch $S_2$ so as to effect the desired degree of phase shift required to regenerate a coherent carrier, but it also inverts the undesired phase quadrature components in a manner which prevents phase fluctuations around the reference phase.

More specifically, the phase reversals of the received signal in regenerator 60 can be broken down into in-phase and quadrature components. Mixer 13 is responsive to the in-phase variations and, hence, actuates switch $S_1$ which provides a 0 or 180 degree phase shift. Mixer 66 is responsive to the quadrature phase variations since the local oscillator 12 output is shifted 90 degrees and an output signal to actuate flip-flop 67 occurs for phase reversals only in the quadrature plane. This is because of the orthogonal relations $\overline{\sin x \sin x} = \frac{1}{2}$ and $\overline{\sin x \cos x} = 0$. (The bar denotes the mean value.) With the reactances of the capacitor 61 and inductor 62 properly chosen, the flip-flop 67 may actuate switch $S_2$ to effect any desired predetermined degree of phase change between 0 and 90 degrees. Since there are two orthogonal loops operating independently of each other, but each operating in a fashion similar to the single loop of regenerator 10 depicted in FIG. 1, the resultant mean signal phase driving the local oscillator may be made equal to zero degrees.

For example, a signal driving phase of zero degrees may be effected with a 60 degree phase shift through the actuation of only switch $S_2$. The relationship between the resistances and reactances of the circuit elements of FIG. 4 necessary to effect this result is defined as follows:

$$\left| \frac{r_{20}}{r_{22} - r_{20}} \right| = \frac{r_{21} - r_{20} \pm jX}{r_{22} - r_{20} + r_{21} \pm jX} \quad (7)$$

where $jX$ represents the effective reactance in the circuit and where the subscripts correspond to the numerals previously employed to identify the resistance elements of the circuit. By arbitrarily designating $\theta_1 = +60$ and $\theta_2 = -60$ degrees for three phase position applications $$\theta_1 = \tan^{-1} \frac{X_1 - X_2}{r_{21} - r_{20}} \quad (8)$$

and $$\theta_2 = \tan^{-1} \frac{-X_2}{r_{22} - r_{20} + r_{21}} \quad (9)$$

where $X_1$ and $X_2$ represent the inductive and capacitive reactances across terminals 26, 27, respectively.

In the four phase position, or quaternary case, $\theta_1$ and $\theta_2$ would preferably be chosen as $+45$ and $-45$ degrees, respectively.

Figures 5A, 5B:
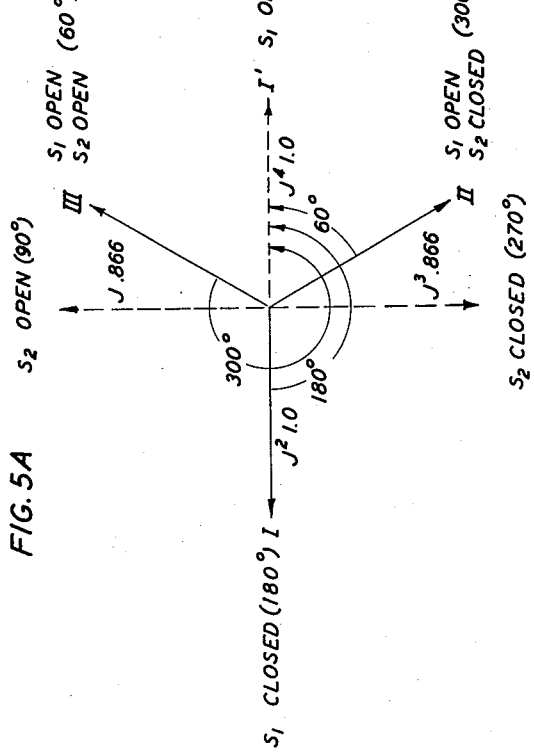
FIGS. 5A and 5B are a vector diagram and a chart, respectively, of assistance in the exposition of the invention as related to the regenerator of FIG. 4.

The manner by which a coherent local carrier is regenerated and the "wobble" is prevented may best be seen from a description of the operation of the regenerator 60 considered in conjunction with a vector diagram analysis of how the received signal is continuously shifted, as required, to the reference phase position, which will be assumed to be at zero degrees. Referring to the vector diagram in FIG. 5A, it will be assumed that the incoming signal is phase position modulated so as to have three distinct phase shift positions of 180, 300 and 60 degrees, as indicated by the solid-lined vectors I, II and III, respectively. It will be further assumed that the effective values of resistance and reactance across terminals 26, 27 of the regenerator 60 are chosen such that a phase shift of —60 degrees is obtained by the actuation of switch $S_2$ only. The necessary circuit parameters required to obtain such a phase shift are of course easily obtained by utilizing the trigonometric relationships defined in Equations 8 and 9. As an aid to understanding better the operation of the regenerator, both the vector diagram and the chart of FIG. 5B associated therewith designate the switching states of $S_1$ and $S_2$ for the various phase relationships under consideration. This chart also lists in tabulated form the pertinent operating conditions for the mixers 13 and 66 in relation to the switching states.

If it is assumed, for example, that the first phase position of the received signal is at 180 degrees (I), a 180 degree phase shift is required to invert the signal phase to the zero degree reference phase. As seen from both the solid-line vector I and the chart of FIG. 5B, this requires that $S_1$ be actuated to close. When the received signal again shifts to a new phase position, such as 300 degrees (II), a phase shift of 60 degrees is required to re-establish the signal at the zero reference phase condition. A 60 degree phase shift necessitates, as indicated by the solid-line vector III, that switch $S_1$ be actuated to open and switch $S_2$ remain open. Similarly, if a subsequent signal of 60 degrees (III) is received, this requires a 300 degree phase shift to re-establish a zero degree carrier at the input of the locked oscillator. To accomplish this, solid-line vector II indicates that switch $S_1$ must remain open and switch $S_2$ must be actuated to close.

From the foregoing description of the operation of regenerator 60, it is seen that the control loop associated with the 90 degree phase shifter 65 functions to insure that any phase quadrature components of the received signal are shifted by an amount, with or without the 180 degree resistance phase shift, such that the received signal applied to the input of the locked oscillator is always at the reference phase. Such quadrature phase shifts, in combination with the 180 degree resistance phase shifts of the received signal, both occurring as a function of the modulation rate, assure the regeneration of a strong, coherent local carrier required for demodulating the signal information.

Once a reference phase has been chosen and a coherent carrier regenerated in the three phase position case, it then becomes necessary to determine in which of the sectors the signal vector is located with respect to the reference sector so that the signal information may be accurately reconstructed. One technique for accomplishing this is with the detector circuit 80 shown in FIG. 6. The detector comprises, in addition to a signal receiver 11, which may be the same as utilized in regenerator 60, a limiter 81 supplied with signals from receiver 11, mixers 82 and 83 connected in parallel and supplied with limited signals from limiter 81, a positive pulse regenerator 84 supplied with signals from mixer 82 and a negative pulse regenerator 85 supplied with signals from mixer 83. The signals produced by regenerators 84 and 85 (i.e., the signals from the parallel paths) are added together to form an output signal at 86. A reference carrier source 87, which may comprise the output of locked oscillator 12 in regenerator 60, is connected directly to the mixer 82 and through a 240 degree phase shifter 88 to mixer 83. The pulse regenerators may be of any conventional type designed to fire whenever an applied input of the proper sign exceeds a threshold, e.g., half the maximum amplitude expected from the output of the mixer associated therewith.

In operation, the received signal is first limited so that amplitude variations do not affect the phase determination. In a three phase position system the signal amplitude never goes to zero, thus the limiter will always function. If the received signal plus its noise produces a resultant phase that is within ±60 degrees of the reference carrier phase or the 240 degree shifted carrier phase, then the output from each of the mixers is greater than one half the maximum or peak expected amplitude of the signal in its undisturbed phase position. Under these conditions, for any phase angle between ±60 degrees of the reference phase a positive output pulse is produced from regenerator 84. Phase angles between 60 degrees and 180 degrees will produce no output from either regenerator. Phase angles between 180 degrees and 300 degrees, however, will produce a negative output from pulse regenerator 85 as a result of the 240 degree phase shift of the received signal applied to mixer 83. It is thus seen that the output of pulse regenerator 84 is always positive and the output of pulse regenerator 85 is always negative. The resultant bipolar output can then be converted into any desired form for utilization by the application of conventional pulse code techniques.

If the limiter is assumed ideal, a peak signal to peak noise voltage ratio in excess of 1.15 is required before errors will be introduced. This is 1.2 db poorer than in the 180 degree binary phase position case, but for the same information rate the bandwidth is reduced by approximately 60 percent. Thus, the three phase position system has an approximately 1 db net advantage over the binary phase position system. This advantage would be slightly greater if the statistics of the noise phase angles were included in the analysis.

FIG. 7 depicts in diagrammatic form a carrier regenerator 90 applicable for use in the demodulation of four phase position signal information. The only basic structural difference between regenerator 90 and regenerator 60 is that the diode switch $S_1$ in regenerator 90 is connected across only the positive resistor 21 rather than across both the positive resistor 21, capacitor 61 and the inductor 62.

In considering several illustrative operating conditions for carrier regenerator 90, it is helpful to assume that the first phase position coded symbol is received at zero degree with both switches $S_1$ and $S_2$ open and that there is a 90 degree separation between adjacent coded phase positions. The dash-lined vectors I through IV in FIG. 8A depict the four phase positions of the received signal and the solid-line vectors with corresponding primed reference numerals represent the newly acquired phase positions of the received signal due to the phase shift network. The vectors also are labeled to show the state of switches $S_1$ and $S_2$ for the various phase relationships under consideration. For clarity, the chart of FIG. 8B also shows the phase shift required for each phase position of the received signal in order to maintain the signal at an arbitrarily chosen reference phase of 45 degrees at the input of the locked oscillator. This will therefore be the phase at which a coherent carrier is regenerated in the illustrative operating example. The chart of FIG. 8B also sets forth in tabulated form the operating conditions of mixers 13 and 66 which give rise to the output control pulses utilized to actuate switches $S_1$ and $S_2$ in the desired manner.

In accordance with the operating conditions set forth, the first phase position (I) of the received signal at zero degree will obviously be shifted to 45 degrees when both switches $S_1$ and $S_2$ are open or nonconducting as indicated by the vector I'. If the next phase position of the received signal is at 90 degrees (II), it is seen from the vector diagram and associated chart of FIG. 8 that a 315 degree phase shift is required to re-establish the received signal at the reference phase of 45 degrees. This requires, as indicated by the vector IV′, that switching diode S₁ remain open and switching diode S₂ close. The necessary phase shifts and switching sequences for the remaining signal phase positions (III and IV) are clearly set forth and readily comprehendible from an examination of the vector diagram and chart.

As in regenerator 60, the second control loop of regenerator 90 associated with the phase shifter 65 assures that the received signal is always shifted back to the reference phase of 45 degrees whenever a phase quadrature component of the signal exists. This is essential if a precise, local carrier is to be regenerated. As the received signal may have only a quadrature component, this control loop therefore operates independently of the loop associated with the switch S₁. Moreover, the control loop assures that any undesired "wobble" or fluctuations that might otherwise exist on either side of the reference phase are prevented.

With a strong, coherent carrier regenerated at the output of the locked oscillator 12 in regenerator 90 in accordance with the principles of the invention, the newly oriented in-phase and quadrature components of the four phase position signal may then be demodulated with conventional homodyne detector apparatus of the type described above with respect to the binary phase position regenerator. The only difference involved in the four phase case is that a portion of the regenerated carrier is shifted 90 degrees with respect to the reference phase so that the quadrature components of the received signal can be demodulated.

It becomes readily apparent from the foregoing that reference phases other than those illustratively described with respect to the operation of carrier regenerators 60 and 90 may be utilized with equal effectiveness. The particular reference phase that is chosen will of course depend primarily on the relationship between the resistances and reactances in the phase shift network and on the degree of phase shift per code symbol employed. In addition, the coherent carrier regenerators can function equally well in so-called differential phase position systems wherein only successive pulses shift the carrier a predetermined number of degrees, the spaces causing no phase shift in the modulation process.

It is to be understood that the specific embodiments described herein are merely illustrative of the general principles of the instant invention. Numerous other structural arrangements and modifications may be devised in the light of this disclosure by those skilled in the art without departing from the spirit and scope of this invention.

What is claimed is:

1. Apparatus for generating a coherent carrier for the demodulation of signal information exhibiting predetermined phase shifts comprising a signal receiver, a locked oscillator, means for maintaining said locked oscillator in precise phase and frequency with predetermined parameters associated with said signal information, said means including means for applying said signal information to said oscillator, a negative resistance element and a positive resistance element serially connected across two output terminals of said receiver, means for selectively altering the circuit resistance of one of said resistance elements in response to a control signal thereby to shift the phase of said signal information selectively from a first predetermined phase to said phase of said locked oscillator, means for mixing said signal information with signals generated by said oscillator to produce a pulse each time said signal information shifts to said first predetermined phase, and means responsive to said pulses for generating said control signal.

2. Apparatus in accordance with claim 1 wherein said negative resistance element comprises a tunnel diode biased in its negative resistance region.

3. Apparatus in accordance with claim 1 wherein said means for selectively altering the circuit resistance of one of said resistance elements in response to a control signal comprises a two-state switching diode and wherein said means responsive to said pulses for generating said control signal comprises a flip-flop circuit.

4. Apparatus in accordance with claim 1 further including a capacitor and an inductor serially connected with said negative and positive resistance elements across the output terminals of said signal receiver, second means for selectively altering the circuit reactance of said inductor in response to a second control signal thereby to shift the phase of said signal information a predetermined number of degrees with respect to said first predetermined phase and said locked oscillator phase, second means for mixing said signal information with signals generated by said oscillator to produce a second pulse each time said signal information shifts other than 180 degrees from said oscillator phase, and means responsive to said pulses for generating said second control signal.

5. Apparatus in accordance with claim 4 wherein said means for selectively altering the circuit resistance of one of said resistance elements also alters the circuit reactance of said inductor and said capacitor in series therewith.

6. Apparatus in accordance with claim 4 further comprising means for preventing "wobble" in the regenerated carrier caused by varying phase quadrature components in the signal information applied to said oscillator, said means including a 90 degree phase shifter inserted between an output of said locked oscillator and an input of said second means for mixing said signal information with signals generated by said oscillator.

7. Apparatus in accordance with claim 4 wherein said means for selectively altering the circuit reactance of said inductor comprises a two-state switching diode, and wherein said second means responsive to said pulses for generating said control signal comprises a flip-flop circuit.

8. Apparatus in accordance with claim 7 wherein said means for selectively altering the resistance of one of said resistance elements comprises a switching diode.

9. Apparatus for generating a coherent carrier for the demodulation of signal information exhibiting predetermined phase shifts and periods comprising a signal source, a locked oscillator of a first predetermined phase and having one input and two outputs, means for applying said signal information to said oscillator, means for maintaining said locked oscillator in precise phase and frequency with an original coherent carrier effectively suppressed before transmission of said signal information, said means including a negative resistance element and a positive resistance element serially connected in shunt with said signal source and having respective values of resistance such that with the resistance of one periodically altered, the effective value of resistance in shunt with said source remains substantially constant with the sign only of the resistance changing to effect a phase shift of said signal information from said first predetermined phase to a second predetermined phase and to produce a time-varying resistance function $R(t)$, and switching means for selectively altering at least said positive resistance element in response to a first predetermined phase shift of said signal information and for effecting said time-varying resistance function $R(t)$, said function producing frequency components which, when mixed with said signal frequency components, produce a coherent carrier at the input of said locked oscillator.

10. Apparatus in accordance with claim 9 further comprising a capacitor and an inductor serially connected with said positive and negative resistance elements in shunt with said signal source, and second switching means for selectively altering the inductance of said inductor in response to a second predetermined phase shift of said signal information to cause said signal information having a component in phase quadrature with respect to said first predetermined phase to be shifted to the latter.

11. Apparatus for generating a coherent carrier for the demodulation of signal information exhibiting predetermined phase shifts and periods comprising a signal receiver, a locked oscillator, means for maintaining said locked oscillator in a precise and predetermined phase in relation to an original coherent carrier effectively suppressed before transmission of said signal information, said means including means for applying said signal information to said oscillator, a tunnel diode biased in its negative resistance region and a resistor exhibiting a positive resistance serially connected across the output of said receiver, switching means for selectively and alternately short-circuiting and reinserting the resistance of said resistor in series with said tunnel diode in response to a control signal thereby to shift the phase of said signal information selectively from a first predetermined phase to said phase of said locked oscillator, means for mixing said signal information with said signals generated by said oscillator to produce a pulse each time said signal information shifts at least to said first predetermined phase, and means responsive to said pulses for generating said control signal to actuate said switching means.

12. Apparatus in accordance with claim 11 further comprising a capacitor and an inductor serially connected with said tunnel diode and said resistor across the output of said receiver, second switching means for selectively and alternately short-circuiting and reinserting at least said inductor in series with said tunnel diode in response to a second control signal thereby to shift any phase components of said signal information in quadrature with the phase of said oscillator by a number of degrees which, when added vectorially with any signal components in said first predetermined phase, will shift the phase of said received signal to the phase of said locked oscillator, second means for mixing said signal information with signals generated by said oscillator to produce a second pulse each time said signal information shifts to a phase position having a component in quadrature with said locked oscillator phase, and second means responsive to said second pulse for generating said second control signal to actuate said second switching means.

13. Apparatus in accordance with claim 12 further comprising means for preventing "wobble" about the phase of said locked oscillator caused by varying phase quadrature components in said signal information, said means comprising a control loop including a 90 degree phase shift network connected between the output of said locked oscillator and said second mixing means.

14. Apparatus in accordance with claim 13 further comprising a detector for ascertaining in which sector signal information exhibiting three distinct phase positions is located with respect to the locked oscillator phase sector, said means comprising a limiter, means for applying said signal information to said limiter, a divider network connected between the output of said limiter and first and second branches, said first branch comprising a first mixer and a positive pulse regenerator, said second branch comprising a second mixer and a negative pulse regenerator, said first and second mixers being adjusted to fire at levels greater than one half the maximum expected signal amplitude, an input to each of said first and second mixers for applying the output of said locked oscillator, a 240 degree phase shifter connected between said locked oscillator and said second mixer, said positive pulse regenerator producing pulses whenever said applied signal is within 60 degrees of said locked oscillator phase, said negative pulse regenerator producing an output whenever the applied signal is between 180 and 300 degrees with respect to said locked oscillator phase, and any applied signals having a phase between 60 and 180 degrees with respect to said locked oscillator phase producing no output from said positive and negative pulse regenerators.

15. In a communications system, means for transmitting signal information exhibiting predetermined phase shifts and periods with a noncoherent carrier, means at the receiving end of said system for regenerating a strong, coherent carrier for use in the demodulation of said signal information comprising a signal receiver with two output terminals, a locked oscillator of predetermined reference phase, means for applying said signal information to said oscillator, means in response to a control signal for producing a time-varying resistance function $R(t)$ which generates frequency components so related to the frequency components of said signal information that their product produces a strong, coherent carrier at the reference phase of said oscillator, said means including a negative resistance element and a positive resistance element serially connected across the output terminals of said receiver, the values of positive and negative resistance being related such that with the resistance of one reduced by a predetermined amount, the net effective resistance across the receiver terminals remains substantially constant with the sign only of the resistance changing, and further including means for selectively altering the circuit resistance of one of said positive and negative resistance elements in response to a control signal thereby to both change the sign in resistance across the output terminals of said receiver and shift the phase of said signal information selectively from a first predetermined phase to said reference phase of said locked oscillator, means for mixing said signal information with signals generated by said oscillator to produce a pulse each time said signal information shifts to said first predetermined phase, and means responsive to said pulses for generating said control signal.

16. Apparatus in accordance with claim 15 wherein said negative resistance element comprises a tunnel diode biased in its negative resistance region and wherein the circuit resistance of said positive resistance element is selectively altered.

17. Apparatus in accordance with claim 15 wherein said means for selectively altering the circuit resistance of one of said positive and negative resistance elements comprises a two-state switching diode and wherein said means responsive to said pulses for generating said control signal comprises a flip-flop circuit.

18. Apparatus in accordance with claim 15 wherein said means for selectively altering the circuit resistance of one of said positive and negative resistance elements also alters the circuit reactances of said inductor and said capacitor and comprises a two-state switching diode connected across said positive resistance element, inductor and capacitor, and wherein said means responsive to said pulses for generating said control signal comprises a flip-flop circuit.

19. Apparatus in accordance with claim 15 further including a capacitor and an inductor serially connected with said negative and positive resistance elements across the output terminals of said signal receiver, second means for selectively altering the circuit inductance of said inductor in response to a second control signal thereby to shift the phase of said signal information a predetermined number of degrees with respect to said first predetermined phase and said locked oscillator reference phase, second means for mixing said signal information with signals generated by said oscillator to produce a second pulse each time said signal information shifts other than 180 degrees, and means responsive to said pulses for generating said second control signal.

20. Apparatus in accordance with claim 19 further including means for preventing "wobble" in the regenerated carrier caused by varying phase quadrature components in the signal information applied to said oscillator, said means comprising a control circuit including a 90 degree phase shifter inserted between an output of said locked oscillator and the input of said second means for mixing said signal information with signals generated by said oscillator.

21. Apparatus in accordance with claim 18 wherein said means for selectively altering the circuit inductance of said inductor comprises a two-state switching diode, and wherein said second means responsive to said second pulse for generating said control signal comprises a flip-flop circuit.

References Cited in the file of this patent

UNITED STATES PATENTS 2,979,611   Halina ---------------- Apr. 11, 1961

FOREIGN PATENTS 413,383   Great Britain ------------ July 25, 1934